(12) United States Patent
Ma et al.

(10) Patent No.: US 12,389,353 B2
(45) Date of Patent: Aug. 12, 2025

(54) TECHNIQUES FOR CONTROLLING TIMING OF WIRELESS COMMUNICATIONS DEVICES IN NON-TERRESTRIAL NETWORKS

(71) Applicant: QUALCOMM Incorporated, San Diego, CA (US)

(72) Inventors: Liangping Ma, San Diego, CA (US); Harikumar Krishnamurthy, San Diego, CA (US); Xiao Feng Wang, San Diego, CA (US); Umesh Phuyal, San Diego, CA (US); Peter Gaal, San Diego, CA (US); Bharat Shrestha, San Diego, CA (US); Alberto Rico Alvarino, San Diego, CA (US); Ayan Sengupta, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/823,002

(22) Filed: Aug. 29, 2022

(65) Prior Publication Data

US 2023/0140535 A1 May 4, 2023

Related U.S. Application Data

(60) Provisional application No. 63/275,376, filed on Nov. 3, 2021.

(51) Int. Cl.
*H04W 56/00* (2009.01)
*H04B 7/185* (2006.01)

(52) U.S. Cl.
CPC .... *H04W 56/0045* (2013.01); *H04B 7/18513* (2013.01)

(58) Field of Classification Search
CPC .................. H04W 56/0045; H04B 7/18513
See application file for complete search history.

(56) References Cited

U.S. PATENT DOCUMENTS

| 2023/0284165 A1* | 9/2023 | Ye ..................... H04B 7/1851 |
|---|---|---|
| | | 370/503 |
| 2024/0224207 A1* | 7/2024 | Zhang ............... H04W 56/0015 |

(Continued)

OTHER PUBLICATIONS

Apple: "On Uplink Time and Frequency Synchronization for NTN", 3GPP TSG RAN WG1 #104b-e, R1-2103108, 3rd Generation Partnership Project, Mobile Competence Centre, 650, Route Des Lucioles, F-06921 Sophia-Antipolis Cedex, France, vol. RAN WG1, No. e-Meeting, Apr. 12, 2021-Apr. 20, 2021, 7 Pages, Apr. 7, 2021, XP052177909, Section 2.

(Continued)

*Primary Examiner* — Yemane Mesfin
*Assistant Examiner* — Salma Ayad
(74) *Attorney, Agent, or Firm* — ArentFox Schiff LLP

(57) ABSTRACT

Aspects described herein relate to receiving an update value for a timing advance of a satellite link between the UE and a base station, computing, based on the update value for the timing advance, a portion of a timing difference between the update value and a previous value for the timing advance of the satellite link that is corrected by closed loop timing advance control from the base station, computing, based at least in part on computing the portion, a total value for the timing advance of the satellite link, and applying, at the UE and based at least in part on the total value for the timing advance of the satellite link and the closed loop timing advance control, an applied timing advance for communicating with the base station.

24 Claims, 4 Drawing Sheets

(56) References Cited

U.S. PATENT DOCUMENTS

2024/0276415 A1* 8/2024 Xu .................... H04B 7/18513
2024/0284372 A1* 8/2024 Chen .................. H04W 56/003
2024/0397462 A1* 11/2024 Yoshioka ........... H04B 7/18506

OTHER PUBLICATIONS

Cewit, et al., "Further Discussion on UL Time Synchronization Methods for NTN Systems", 3GPP TSG RAN WG1 #104b-e, R1-2103731, 3rd Generation Partnership Project, Mobile Competence Centre, 650 Route Des Lucioles, F-06921 Sophia-Antipolis Cedex, France , vol. RAN WG1, No. E-meeting, Apr. 12, 2021-Apr. 20, 2021, 8 Pages, Apr. 7, 2021, XP052178363, Section 2.

China Telecom: "Discussion on UL Time and Frequency Synchronization for NR NTN", 3GPP TSG-RAN WG1 #104-b, R1-2102865, 3rd Generation Partnership Project (3GPP), Mobile Competence Centre, 650 Route Des Lucioles, F-06921 Sophia-Antipolis Cedex, France, vol. RAN WG1, No. e-Meeting, Apr. 12, 2021-Apr. 20, 2021, 3 Pages, Apr. 6, 2021, XP052058897, Section 2.

Interdigital, et al., "On UL Time/Frequency Synchronization for NTN", 3GPP TSG RAN WG1 #104-e, R1-2100985, 3rd Generation Partnership Project (3GPP), Mobile Competence Centre, 650, Route Des Lucioles, F-06921 Sophia-Antipolis Cedex, France, vol. RAN WG1, No. e-Meeting, Jan. 25, 2021-Feb. 5, 2021, 4 Pages, Jan. 18, 2021, XP051971320, Section 2.

International Search Report and Written Opinion—PCT/US2022/075672—ISA/EPO—Dec. 7, 2022.

Sony: "Enhancement for UL Time Synchronization", 3GPP TSG RAN WG1 #104b-e, R1-2103305, 3rd Generation Partnership Project (3GPP), Mobile Competence Centre, 650, Route Des Lucioles, F-06921 Sophia-Antipolis Cedex, France, vol. Ran WG1, No. e-Meeting, Apr. 12, 2021-Apr. 20, 2021, Apr. 7, 2021, XP052178072, Section 2.

* cited by examiner

TECHNIQUES FOR CONTROLLING TIMING OF WIRELESS COMMUNICATIONS DEVICES IN NON-TERRESTRIAL NETWORKS

CLAIM OF PRIORITY UNDER 35 U.S.C. § 119

The present Application for Patent claims priority to Provisional Patent Application No. 63/275,376, entitled "TECHNIQUES FOR CONTROLLING TIMING OF WIRELESS COMMUNICATIONS DEVICES IN NON-TERRESTRIAL NETWORKS" filed Nov. 3, 2021, which is assigned to the assignee hereof and hereby expressly incorporated by reference herein for all purposes.

BACKGROUND

Aspects of the present disclosure relate generally to wireless communication systems, and more particularly, to device timing for wireless communications in non-terrestrial networks.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, non-terrestrial networks (NTN) are being deployed to extend service to devices in locations that may not have cellular coverage. In NTN networks, a satellite can be used to relay communications between a user equipment (UE) (or other device) and a reference point that is communicatively coupled with a base station or other cellular network infrastructure. For example, the reference point may include a gateway satellite dish or other mechanism that can transmit signals to, and/or receive signals from, the satellite.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method of wireless communication at a user equipment (UE) is provided that includes receiving an update value for a timing advance of a satellite link between the UE and a base station, computing, based on the update value for the timing advance, a portion of a timing difference between the update value and a previous value for the timing advance of the satellite link that is corrected by closed loop timing advance control from the base station, computing, based at least in part on computing the portion, a total value for the timing advance of the satellite link, and applying, at the UE and based at least in part on the total value for the timing advance of the satellite link and the closed loop timing advance control, an applied timing advance for communicating with the base station.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

In an aspect, an apparatus for wireless communication is provided that includes a processor, memory coupled with the processor, and instructions stored in the memory. The instructions are operable, when executed by the processor, to cause the apparatus to receive an update value for a timing advance of a satellite link between the apparatus and a base station, compute, based on the update value for the timing advance, a portion of a timing difference between the update value and a previous value for the timing advance of the satellite link that is corrected by closed loop timing advance control from the base station, compute, based at least in part on computing the portion, a total value for the timing advance of the satellite link, and apply, at the apparatus and based at least in part on the total value for the timing advance of the satellite link and the closed loop timing advance control, an applied timing advance for communicating with the base station.

In another aspect, an apparatus for wireless communications is provided that includes means for receiving an update value for a timing advance of a satellite link between the apparatus and a base station, means for computing, based on the update value for the timing advance, a portion of a timing difference between the update value and a previous value for the timing advance of the satellite link that is corrected by closed loop timing advance control from the base station, means for computing, based at least in part on computing the portion, a total value for the timing advance of the satellite link, and means for applying, based at least in part on the total value for the timing advance of the satellite link and the closed loop timing advance control, an applied timing advance for communicating with the base station.

In another aspect, a computer-readable medium including code executable by one or more processors for wireless communication at a UE is provided. The code includes code for receiving an update value for a timing advance of a satellite link between the UE and a base station, computing, based on the update value for the timing advance, a portion of a timing difference between the update value and a previous value for the timing advance of the satellite link that is corrected by closed loop timing advance control from the base station, computing, based at least in part on computing the portion, a total value for the timing advance of the satellite link, and applying, at the UE and based at least in part on the total value for the timing advance of the satellite link and the closed loop timing advance control, an applied timing advance for communicating with the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
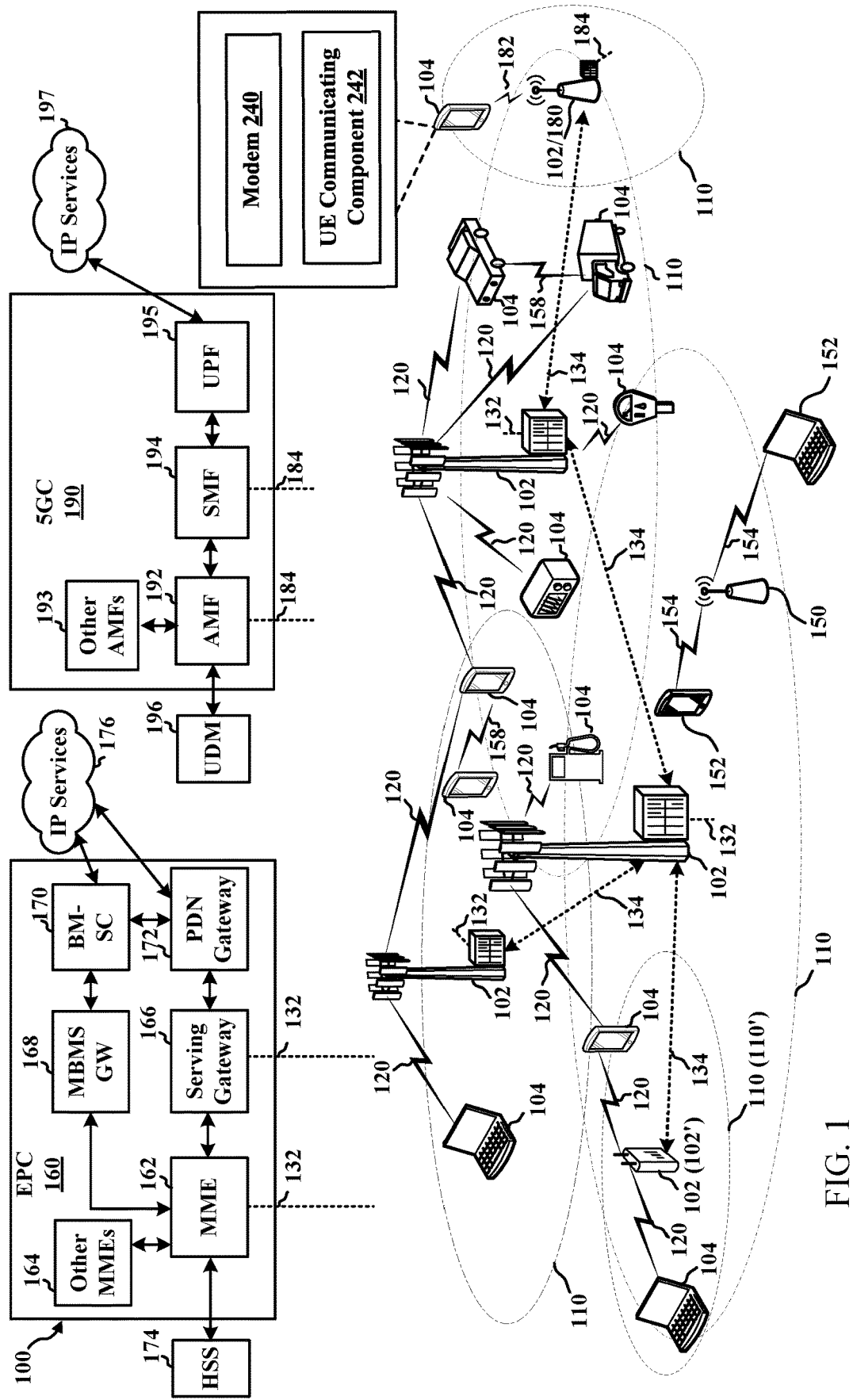
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to controlling timing of wireless communication devices in non-terrestrial networks (NTNs). In fifth generation (5G) new radio (NR) wireless communication technologies, NTNs can be deployed that include a reference point that is communicatively coupled with a base station or other 5G NR network architecture. The reference point may include a gateway node, such as a satellite dish, that can communicate with (or via) a satellite. The satellite can relay communications between the reference point and a device (e.g., user equipment (UE)) that is also capable of receiving or transmitting communications via the satellite. In this configuration, for example, the link between the reference point and the satellite, referred to as a feeder link, can have a propagation delay, as can the link between the satellite and the device, referred to as the service link. In this regard, for example, the feeder link can be associated with a common timing advance (TA) that can be common to any device communicating with the reference point via the satellite, and each service link can be associated with a device-specific TA (also referred to herein as a UE-specific TA) that is specific to the service link for the given device.

A device in 5G NR can apply a TA for wireless communications to account for propagation delay in the link between the device and a base station, and the base station can update the device with a TA update, referred to as $N_{TA}$, which the device can accumulate and apply over time. In an example, $N_{TA}=0$ for physical random access channel (PRACH) and/or can be updated based on TA Command field in msg2/msgB and media access control (MAC) control element (CE) TA command received from the base station. A device operating in a NTN, referred to as a NTN device or NTN UE, can, in addition to applying the $N_{TA}$, apply a TA specific to the service link of the device (e.g., UE), referred to herein as the UE-specific TA or $N_{TA,UE-specific}$, and also a TA specific to the feeder link, referred to herein as the common TA or $N_{TA,common}$. In one specific example, an NTN UE can apply a timing advance $T_{TA}$, where $$T_{TA}=(N_{TA}+N_{TA,UE-specific}+N_{TA,common}+N_{TA,offset})\times T_C$$

where $N_{TA,offset}$ can be a fixed offset used to calculate the TA, and $T_C$ can be the speed of light (e.g., $T_C=1/(480000\times4096)$ seconds). The time at which the device receives or determines TAs can be different, which can cause a possible double correction in the TA to occur, which may result in inaccuracy of the TA. For example, the device can determine the UE-specific TA based on the device's location provided by a global navigation satellite system (GNSS) fix (e.g., global positioning system (GPS) fix, etc.) which may take a few second to complete and may not occur very often, and may be based on the satellite position provided by the satellite ephemeris and/or an orbit propagation/prediction model. Change in location of the device can cause timing error to occur at the device, which may be corrected by the base station performing closed loop TA (and sending $N_{TA}$, as described above). When the device updates location using a GNSS fix, the update can correct the timing error that has already been corrected by the closed loop TA performed at the base station, resulting in a double correction and more inaccurate timing based on the TAs. Double correction may also be referred to as double adjustment, or double timing adjustment.

One possible solution is to update the UE-specific TA, $N_{TA,UE-specific}$, using the new location from the GNSS fix, and adjust the accumulative closed loop TA, $N_{TA}$, by subtracting a difference in the UE-specific TA (e.g., subtracting $N_{TA,UE-specific,new}-N_{TA,UE-specific,old}$). As a result, the total TA, $T_{TA}$, does not change at a GNSS fix, thus avoiding double correction, and thereafter the UE can use the up-to-date GNSS fix in calculating the UE-specific TA. This assumes, however, that the timing error due to UE location inaccuracy has been fully corrected by the closed loop TA, which may not be true, e.g., when there are no uplink transmissions or not sufficient TA commands between two GNSS fixes. For example, in a current NR spec, the timeAlignmentTimer ranges from 500 ms to 10240 ms, and a UE may have moved 300 meters (corresponding to a maximum of 1 μs timing error) in 10 seconds at velocity 30 m/sec.

Aspects described herein relate to computing, based on a received update value for a link-specific TA (e.g., a UE-specific TA for a service link or a common TA for a feeder link), a total TA to apply in wireless communications. In accordance with aspects described herein, based on the update value received for the link-specific TA, a portion of timing difference between the update value and a previous value for the link specific TA that is corrected by closed loop TA control can be computed and used in determining the total TA to apply. In one specific example, the timing difference between the update value and the previous value can be multiplied by the portion of the timing difference corrected by the closed loop TA, and that amount can be subtracted from the received update value for the link-specific TA to determine the total TA. In another specific example, the timing difference between the update value and the previous value can be multiplied by a remaining portion of the timing difference that was corrected by the closed loop TA (e.g., one minus the portion), and that amount can be added to the previous value for the link-specific TA to determine the total TA. In yet another specific example, the timing difference between the update value and the previous value can be multiplied by the portion of the timing difference corrected by the closed loop TA, and the closed loop TA can be adjusted by that amount to determine the total TA. In an example, these examples can be applied for the link-specific TA including the UE-specific TA (e.g., the service link TA) or the common TA (e.g., the feeder link TA).

Computing the portion of the TA corrected by closed loop TA in this regard can avoid a double timing error correction due to difference in time between closed loop TA adjustments and location updates (e.g., GNSS fixes) for a device. Avoiding the double timing error correction can allow for more accurate timing between the device and base station in communications that traverse the NTN. More accurate timing between the nodes, in this regard, can improve reliability of the communications between the device and base station, which can improve user experience in using the device.

The described features will be presented in more detail below with reference to FIGS. 1-4.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and UE communicating component 242 for computing one or more TA values for applying a TA for communicating in a NTN, in accordance with aspects described herein. Though a UE 104 is shown as having the modem 240 and UE communicating component 242, this is one illustrative example, and substantially any node or type of node may include a modem 240 and UE communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface).

The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available. The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)).

In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2:
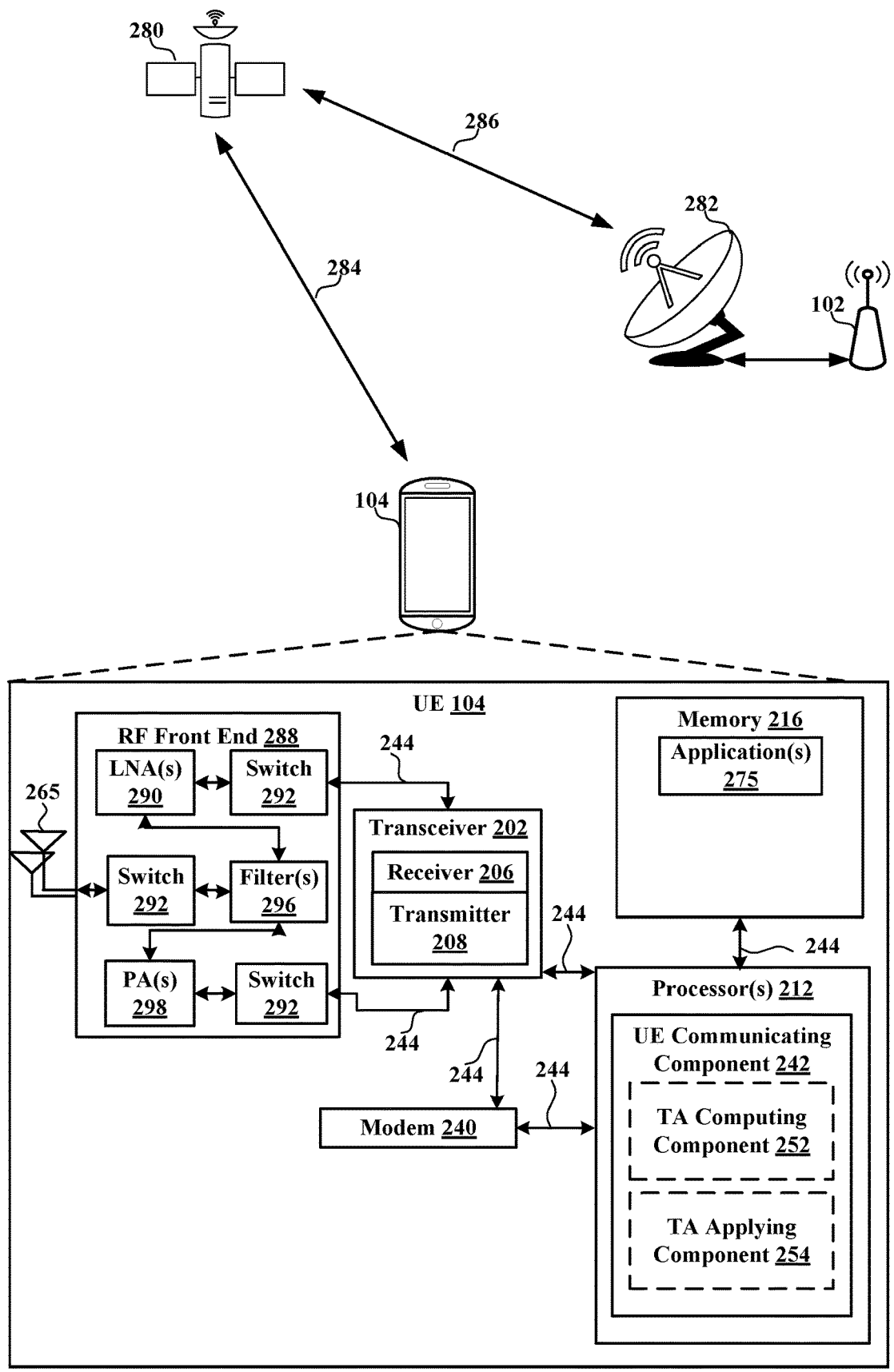
FIG. 2 is a block diagram illustrating an example of a UE, in accordance with various aspects of the present disclosure.
Figure 3:
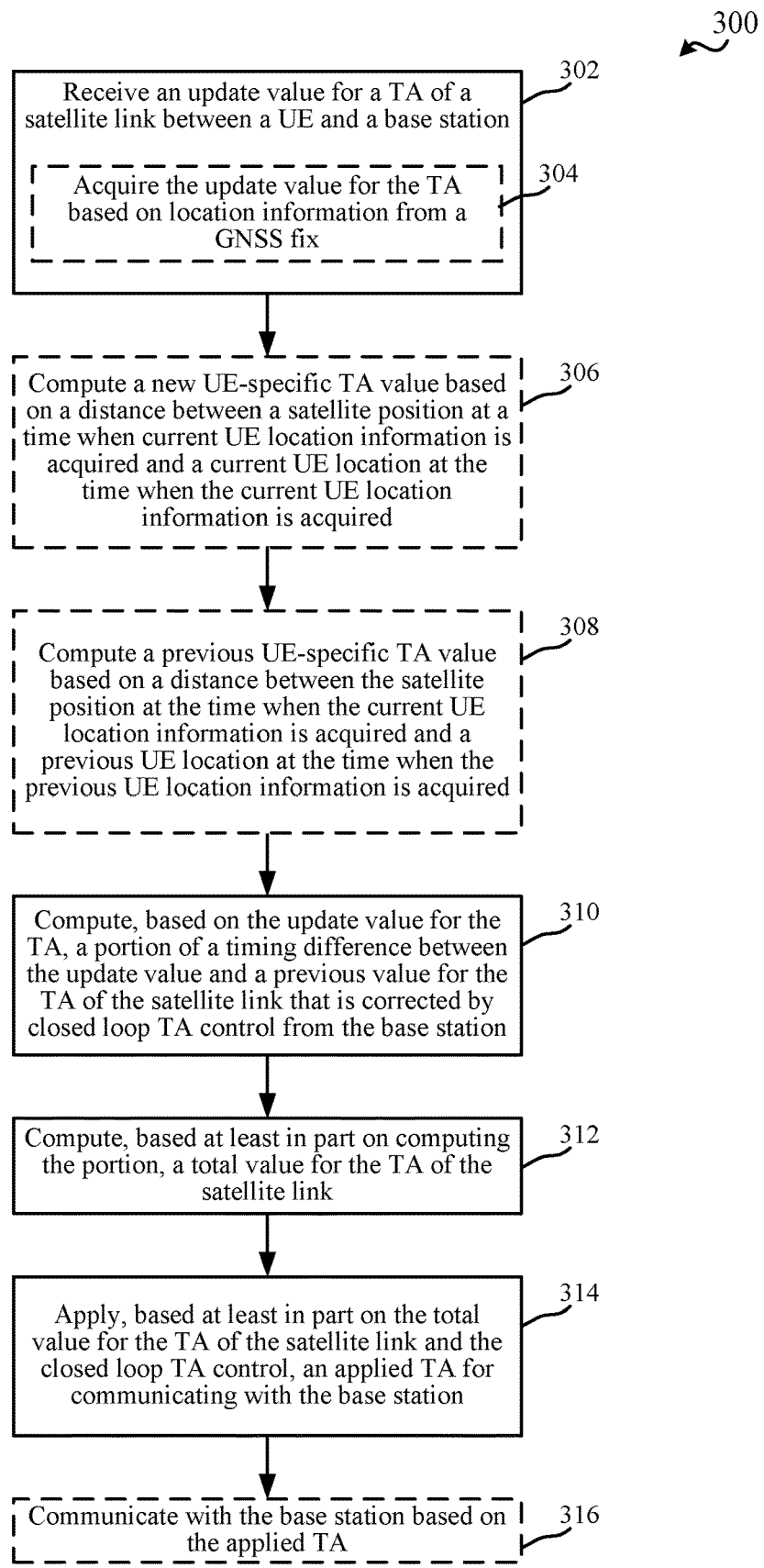
FIG. 3 is a flow chart illustrating an example of a method for computing one or more timing advance (TA) values, in accordance with aspects described herein.
Figure 4:
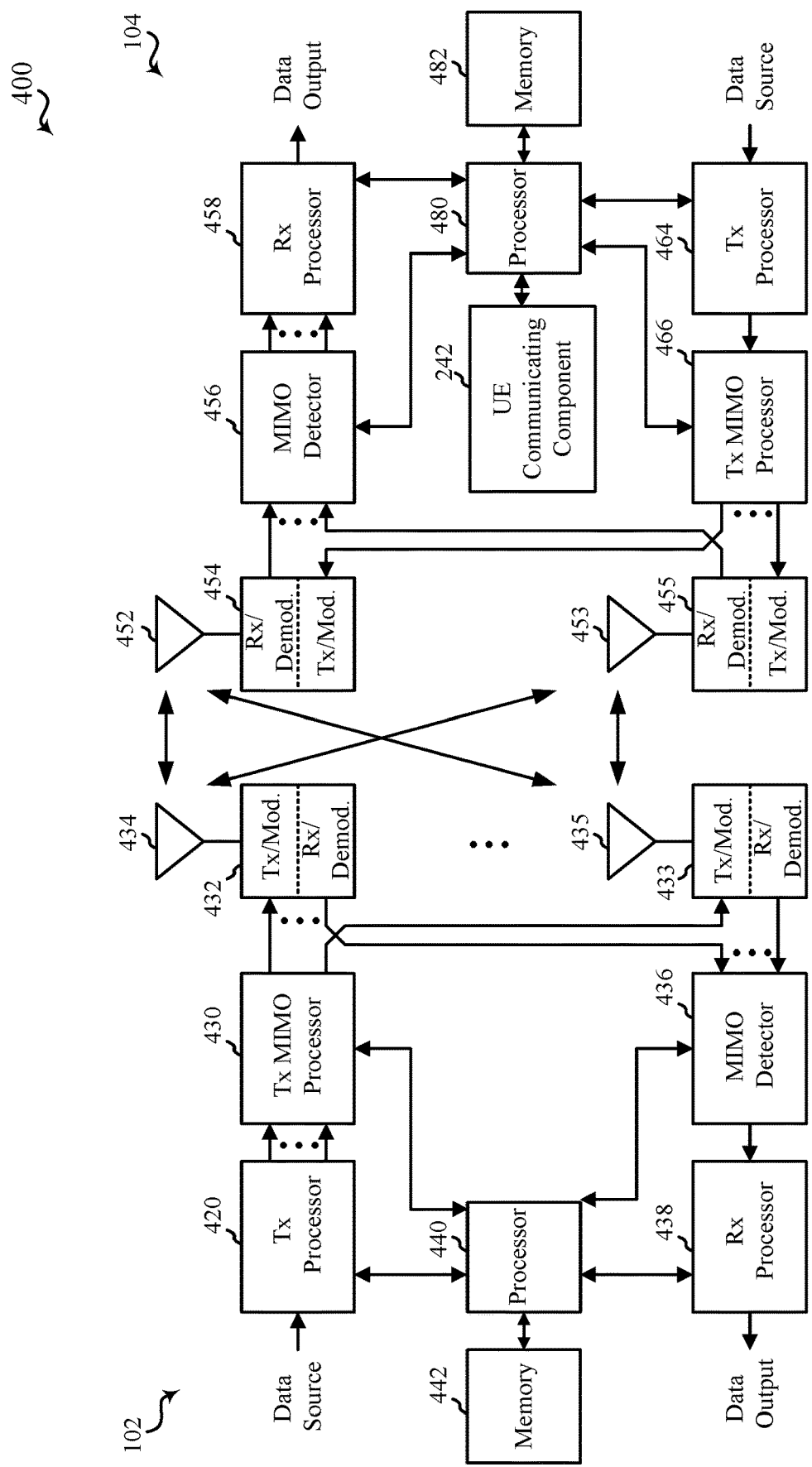
FIG. 4 is a block diagram illustrating an example of a MIMO communication system including a base station and a UE, in accordance with various aspects of the present disclosure.

Turning now to FIGS. 2-4, aspects are depicted with reference to one or more components and one or more methods that may perform the actions or operations described herein, where aspects in dashed line may be optional. Although the operations described below in FIG. 3 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or UE communicating component 242 for computing one or more TA values for applying a TA for communicating in a NTN, in accordance with aspects described herein.

In an aspect, the one or more processors 212 can include a modem 240 and/or can be part of the modem 240 that uses one or more modem processors. Thus, the various functions related to UE communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with UE communicating component 242 may be performed by transceiver 202.

Also, memory 216 may be configured to store data used herein and/or local versions of applications 275 or UE communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining UE communicating component 242 and/or one or more of its subcomponents, and/or data associated therewith, when UE 104 is operating at least one processor 212 to execute UE communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application. Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 242 can optionally include a TA computing component 252 for computing one or more TAs for adjusting timing of communications in a NTN, and/or a TA applying component 254 for applying the one or more computed TAs in communicating with a base station 102 in the NTN, in accordance with aspects described herein.

In an example, the UE 104 can communicate with the base station 102 in a NTN that includes a satellite 280 and a reference point 282, which may be a satellite dish or one or more other nodes that can be communicatively coupled to a base station 102 and/or to the satellite 280 to facilitate NTN communications between the UE 104 and base station 102. In an example, the base station 102 can include a monolithic base station, a disaggregated base station or a portion there of (such as a CU, DU, RC, etc., as described above), and/or the like.

For example, UE 104 can communicate with the satellite 280 via a service link 284, as described, where the satellite 280 may support other service links with other UEs. In an example, reference point 282 can communicate with the satellite 280 via a feeder link 286, which may be common to UEs served by the base station 102. In an example, as described, service link 284 may have a propagation delay, and may use a UE-specific TA to account for the propagation delay. In addition, for example, feeder link 286 may have propagation delay, and may use a common TA to account for the propagation delay. In an example, the satellite 280 can provide a relay functionality for the reference point 282 and/or UE 104, which may include forwarding communications to/from the reference point 282 and/or UE 104, amplifying and forwarding the communications, etc. In another example, satellite 280 can be a regenerative satellite that can provide a base station function to the UE 104 (and in which case the feeder link may not be present or may not have propagation delay, etc.).

In an example, TA computing component 252 can compute TAs for each of multiple links, and/or may also compute a portion of a timing error between the UE 104 and base station 102 that is corrected by closed loop TA commands received from the base station 102. Based on this portion, TA computing component 252 may determine how to apply an updated TA that may be determined from a GNSS fix or based on an update to a common TA received from the base station 102. In any case, for example, TA applying component 254 can apply the TA to communications with the base station 102.

In an aspect, the processor(s) 212 may correspond to one or more of the processors described in connection with the UE in FIG. 4. Similarly, the memory 216 may correspond to the memory described in connection with the UE in FIG. 4.

FIG. 3 illustrates a flow chart of an example of a method 300 for computing one or more TA values for applying a TA for communicating with a base station in a NTN, in accordance with aspects described herein. In an example, a UE 104 can perform the functions described in method 300 using one or more of the components described in FIGS. 1-2.

In method 300, at Block 302, an update value for a TA of a satellite link between a UE and a base station can be received. In an aspect, TA computing component 252, e.g., in conjunction with processor(s) 212, memory 216, transceiver 202, UE communicating component 242, etc., can receive an update value for a TA of the satellite link between the UE and the base station. For example, TA computing component 252 can receive the update value as a link-specific TA value, such as a UE-specific TA value for a service link, a common TA value for a feeder link, and/or the like.

In one example, in receiving the update value for the TA at Block 302, optionally, at Block 304, the update value for the TA can be acquired based on location information from a GNSS fix (e.g., GNSS fix). In an aspect, TA computing component 252, e.g., in conjunction with processor(s) 212, memory 216, transceiver 202, UE communicating component 242, etc., can acquire the update value for the TA based on the location information from the GNSS fix. As described, for example, the UE 104 can perform the GNSS fix to determine a location of the UE 104. The UE 104, in one example, can determine the position of the satellite 280 by an ephemeris of the satellite and an orbit prediction model. The UE 104 can periodically perform the GNSS fix to determine its location and/or to correct any timing error resulting from the change in location of the UE 104. The UE 104 can compute a new value for the TA and a previous value for the TA, and can determine the timing error corrected by the UE location change based on a difference in the values.

In one example, in method 300, optionally at Block 306, a new UE-specific TA value can be computed based on a distance between a satellite position at a time when the current UE location information is acquired and the current UE location at the time when the current UE location information is acquired. In an aspect, TA computing component 252, e.g., in conjunction with processor(s) 212, memory 216, transceiver 202, UE communicating component 242, etc., can compute a new UE-specific TA value, which may be referred to herein as $N_{TA,UE\text{-}specific,new}$, based on a distance between the satellite position at the time when the current UE location information is acquired and the UE location at the time when the current UE location information is acquired. For example, TA computing component 252 can determine the satellite position, $s(n+1)$, at the time when the current UE location information is acquired (at the time of the $(n+1)$'th GNSS fix), as well as the UE location, $u(n+1)$, at the time when the current UE location information is acquired (at the time of the $(n+1)$'th GNSS fix) In this example, TA computing component 252 can compute the new UE-specific TA value as $|s(n+1)-u(n+1)/c|$, where c is the speed of light (e.g., $c=1/(480000\times4096)$sec).

In one example, in method 300, optionally at Block 308, a previous UE-specific TA value can be computed based on a distance between the satellite position at the time when the current UE location information is acquired and a previous UE location at the time when the previous UE location information is acquired. In an aspect, TA computing component 252, e.g., in conjunction with processor(s) 212, memory 216, transceiver 202, UE communicating component 242, etc., can compute the previous UE-specific TA value, which may be referred to herein as $N_{TA,UE\text{-}specific,old}$ based on the distance between the satellite position at the time when the current UE location information is acquired and the previous UE location at the time when the previous UE location information is acquired. For example, TA computing component 252 can determine the satellite position, $s(n+1)$, at the time when the UE location information is acquired (at the time of the $(n+1)$'th GNSS fix), as well as the previous UE location, $u(n)$, at the time the current UE location information is acquired (at the time of the n'th GNSS fix). In this example, TA computing component 252 can compute the previous UE-specific TA value as $|s(n+1)-u(n)/c|$.

In this example, TA computing component 252 can determine the timing error due to the UE location change as the previous UE-specific TA value subtracted from the new UE-specific TA value (e.g., $N_{TA,UE\text{-}specific,new} - N_{TA,UE\text{-}specific,old}$). In addition, TA computing component 252 can determine the update value for the UE-specific TA value, which may be determined based on, or as, the timing error due to the UE location change.

In another example, TA computing component 252 can determine the update value for the TA of the satellite link as the common feeder link TA value, which may be received from the base station 102. For example, the common TA value may change based on change in position of the satellite, which can impact propagation on the feeder link. In this example, TA computing component 252 can receive an update to the common TA from the base station 102, which can be referred to herein as $N_{TA,common,new}$ In this example, TA computing component 252 can determine the timing error due to common TA change as a previously received common TA value, $N_{TA,common,old}$, subtracted from the new common TA value (e.g., $N_{TA,common,new} - N_{TA,common,old}$) In addition, TA computing component 252 can determine the update value for the common TA as the common TA value, which may be determined based on, or as, the timing error due to the common TA change.

In method 300, at Block 310, a portion of timing difference between the update value and a previous value for the TA of the satellite link that is corrected by closed loop TA control from the base station can be computed based on the update value for the TA. In an aspect, TA computing component 252, e.g., in conjunction with processor(s) 212, memory 216, transceiver 202, UE communicating component 242, etc., can compute, based on the update value for the TA, the portion of the timing difference between the update value and the previous value for the TA of the satellite link that is corrected by closed loop TA control from the base station. This portion can be referred to herein as x. For example, TA computing component 252 can compute this portion based on the sum of TA values carried in TA commands received from the base station 102 (e.g., at the UE 104) in closed loop TA control in a time period between the time when the update value for the link-specific TA (e.g., the UE-specific TA or common TA) is received and the time when the previous value for the link-specific TA is received. For example, TA computing component 252 can receive the TA values in TA commands received from the base station 102 in closed loop TA, which may occur more frequently than GNSS fixes, as described. For example, TA computing component 252 can receive the TA values in TA commands in media access control (MAC) control elements (CEs) from the base station 102. In one example, TA computing component 252 can compute the portion of timing difference between the update value and a previous value for the TA of the satellite link that is corrected by closed loop TA control as the sum of TA values, described above, divided by the difference between the update value and a previous value for the TA of the satellite link, or the absolute value of the difference.

For example, where the link-specific TA of the satellite is the UE-specific TA, TA computing component 252 can compute this portion based on the sum of TA values received between the time when the update value, $N_{TA,UE\text{-}specific,new}$ is received and the time when the previous value, $N_{TA,UE\text{-}specific,old}$, is received. TA computing component 252 can then compute the portion as the sum of TA values divided by $N_{TA,UE\text{-}specific,new} - N_{TA,UE\text{-}specific,old}$.

In another example, where the link-specific TA value of the satellite link is the common TA, TA computing component 252 can compute this portion based on the sum of TA values received between the time when the update value, $N_{TA,common,new}$ is received and the time when the previous value, $N_{TA,common,old}$, is received. TA computing component 252 can then compute the portion as the sum of TA values divided by $N_{TA,common,new} - N_{TA,common,old}$.

In method 300, at Block 312, a total value for the TA of the satellite link can be computed based at least in part on computing the portion. In an aspect, TA computing component 252, e.g., in conjunction with processor(s) 212, memory 216, transceiver 202, UE communicating component 242, etc., can compute, based at least in part on computing the portion of timing difference between the update value and a previous value for the TA of the satellite link that is corrected by closed loop TA control, the total value for the TA of the satellite link. In one example, where the satellite link is the service link, TA computing component 252 can compute the total value for the UE-specific TA (e.g., $N_{TA,UE\text{-}specific}$) to account for the remaining timing error as $N_{TA,UE\text{-}specific,old} + (1-x)(N_{TA,UE\text{-}specific,new} - N_{TA,UE\text{-}specific,old})$, where x is the portion of the timing error corrected by closed loop TA control, computed as described above. In another example, where the satellite link is the service link, TA computing component 252 can compute the total value for the UE-specific TA as $N_{TA,UE\text{-}specific,new} - x(N_{TA,UE\text{-}specific,new} - N_{TA,UE\text{-}specific,old})$. In another example, TA computing component 252 can set the UE-specific TA (e.g., $N_{TA,UE\text{-}specific}$) as the update value determined from the GNSS fix (e.g., as received at Block 302), and can adjust the closed loop timing TA value, $N_{TA}$, to $N_{TA} - x(N_{TA,UE\text{-}specific,new} - N_{TA,UE\text{-}specific,old})$.

In an example, where the satellite link is the feeder link, TA computing component 252 can compute the total value for the common TA (e.g., $N_{TA,common}$) to account for the remaining timing error as $N_{TA,common,old} + (1-x)(N_{TA,common,new} - N_{TA,common,old})$, where x is the portion of the timing error corrected by closed loop TA control, computed as described above. In another example, where the satellite link is the feeder link, TA computing component 252 can compute the total value for the common TA as $N_{TA,common,new} - x(N_{TA,common,new} - N_{TA,common,old})$. In another example, TA computing component 252 can set the common TA (e.g., $N_{TA,common}$) as the update value received from the base station 102 (e.g., as received at Block 302), and can adjust the closed loop timing TA value, $N_{TA}$, to $N_{TA} - x(N_{TA,common,new} - N_{TA,common,old})$. In some aspects, the common TA without the derivatives of the common TA can be signaled by the base station 102. In some aspects, the common TA and the derivatives of common TA can be signaled by the base station 102, and the common TA $N_{TA,common,new}$ can be the common TA calculated from the newly signaled common TA and the associated derivatives, e.g., $N_{TA,common,new}$ is calculated as a polynomial whose coefficients are the signaled common TA and the associated derivatives, and $N_{TA,common,old}$ can be the common TA calculated from the previously signaled common TA and the associated derivatives, e.g., via Taylor series.

In some examples, there may not be TA commands received during the time period between the time when the update value for the link-specific TA is received and the time when the previous value for the link-specific TA is received. In this example, the sum, and thus the portion, x, can be zero (0). In this example, whether based on the formula above or based on determining that no TA commands were received during the time period, TA computing component 252 can set the link-specific TA (e.g., $N_{TA,UE\text{-}specific}$ or $N_{TA,common}$) as the update value received at Block 302 (e.g., the TA value determined from the GNSS fix or received as a new TA of the satellite link, whether the service link or the feeder link).

In method 300, at Block 314, an applied TA can be applied for communicating with the base station based at least in part on the total value for the TA of the satellite link and the closed loop TA control. In an aspect, TA applying component 254, e.g., in conjunction with processor(s) 212, memory 216, transceiver 202, UE communicating component 242, etc., can apply, based at least in part on the total value of the TA of the satellite link and the closed loop TA control, the applied TA for communicating with the base station. In one example, TA computing component 252 can compute the applied TA as:

$$T_{TA} = (N_{TA} + N_{TA,UE\text{-}specific} + N_{TA,common} + N_{TA,offset}) \times T_C$$

based on receiving the update value at Block 302, where one or more of $N_{TA}$, $N_{TA,UE\text{-}specific}$, or $N_{TA,common}$, can be computed and/or adjusted, as described above. TA applying component 254 can apply the applied TA, $T_{TA}$, to communications with the base station 102 to align timing of the communications at the UE 104 and base station 102 through the NTN.

In method 300, optionally at Block 316, the base station can be communicated with based on the applied TA. In an aspect, UE communicating component 242, e.g., in conjunction with processor(s) 212, memory 216, transceiver 202, etc., can communicate with the base station based on the applied TA. For example, UE communicating component 242 can transmit communications to, or receive communications from, the base station 102 based on adjusting a timing for transmitting, or receiving, by the applied TA, $T_{TA}$.

FIG. 4 is a block diagram of a MIMO communication system 400 including a base station 102 and a UE 104. The MIMO communication system 400 may illustrate aspects of the wireless communication access network 100 described with reference to FIG. 1. The base station 102 may be an example of aspects of the base station 102 described with reference to FIG. 1. The base station 102 may be equipped with antennas 434 and 435, and the UE 104 may be equipped with antennas 452 and 453. In the MIMO communication system 400, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 420 may receive data from a data source. The transmit processor 420 may process the data. The transmit processor 420 may also generate control symbols or reference symbols. A transmit MIMO processor 430 may perform spatial processing (e.g., precoding) on data symbols, control symbols, or reference symbols, if applicable, and may provide output symbol streams to the transmit modulator/demodulators 432 and 433. Each modulator/demodulator 432 through 433 may process a respective output symbol stream (e.g., for OFDM, etc.) to obtain an output sample stream. Each modulator/demodulator 432 through 433 may further process (e.g., convert to analog, amplify, filter, and upconvert) the output sample stream to obtain a DL signal. In one example, DL signals from modulator/demodulators 432 and 433 may be transmitted via the antennas 434 and 435, respectively.

The UE 104 may be an example of aspects of the UEs 104 described with reference to FIGS. 1-2. At the UE 104, the UE antennas 452 and 453 may receive the DL signals from the base station 102 and may provide the received signals to the modulator/demodulators 454 and 455, respectively. Each modulator/demodulator 454 through 455 may condition (e.g., filter, amplify, downconvert, and digitize) a respective received signal to obtain input samples. Each modulator/demodulator 454 through 455 may further process the input samples (e.g., for OFDM, etc.) to obtain received symbols. A MIMO detector 456 may obtain received symbols from the modulator/demodulators 454 and 455, perform MIMO detection on the received symbols, if applicable, and provide detected symbols. A receive (Rx) processor 458 may process (e.g., demodulate, deinterleave, and decode) the detected symbols, providing decoded data for the UE 104 to a data output, and provide decoded control information to a processor 480, or memory 482.

The processor 480 may in some cases execute stored instructions to instantiate a UE communicating component 242 (see e.g., FIGS. 1 and 2).

On the uplink (UL), at the UE 104, a transmit processor 464 may receive and process data from a data source. The transmit processor 464 may also generate reference symbols for a reference signal. The symbols from the transmit processor 464 may be precoded by a transmit MIMO processor 466 if applicable, further processed by the modulator/demodulators 454 and 455 (e.g., for SC-FDMA, etc.), and be transmitted to the base station 102 in accordance with the communication parameters received from the base station 102. At the base station 102, the UL signals from the UE 104 may be received by the antennas 434 and 435, processed by the modulator/demodulators 432 and 433, detected by a MIMO detector 436 if applicable, and further processed by a receive processor 438. The receive processor 438 may provide decoded data to a data output and to the processor 440 or memory 442.

The components of the UE 104 may, individually or collectively, be implemented with one or more ASICs adapted to perform some or all of the applicable functions in hardware. Each of the noted modules may be a means for performing one or more functions related to operation of the MIMO communication system 400. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 400.

The following aspects are illustrative only and aspects thereof may be combined with aspects of other embodiments or teaching described herein, without limitation.

Aspect 1 is a method for wireless communications at a UE including receiving an update value for a timing advance of a satellite link between the UE and a base station, computing, based on the update value for the timing advance, a portion of a timing difference between the update value and a previous value for the timing advance of the satellite link that is corrected by closed loop timing advance control from the base station, and computing, based at least in part on computing the portion, a total value for the timing advance of the satellite link; and applying, at the UE and based at least in part on the total value for the timing advance of the satellite link and the closed loop timing advance control, an applied timing advance for communicating with the base station.

In Aspect 2, the method of Aspect 1 includes acquiring location information for the UE from a GNSS fix, wherein the update value for the timing advance includes a new UE-specific timing advance value that is based on the acquired location information, and wherein the previous value for the timing advance includes a previous UE-specific timing advance value that is based on previously acquired location information for the UE from a previous GNSS fix.

In Aspect 3, the method of Aspect 2 includes where the new UE-specific timing advance value and the previous UE-specific timing advance value are associated with a same satellite position and different UE locations.

In Aspect 4, the method of any of Aspects 2 or 3 includes where computing the total value includes adding, to the previous UE-specific timing advance value, the timing difference between the update value and the previous value multiplied by a remaining portion of the timing difference that is not corrected by the closed loop timing advance control.

In Aspect 5, the method of any of Aspects 2 or 3 includes where computing the total value includes subtracting, from the new UE-specific timing advance value, the timing difference between the update value and the previous value multiplied by the portion of the timing difference that is corrected by the closed loop timing advance control.

In Aspect 6, the method of any of Aspects 2 or 3 includes where computing the total value includes setting the total value as the new UE-specific timing advance value, and adjusting a closed loop timing advanced value from the closed loop timing advance control by the timing difference between the update value and the previous value multiplied by the portion of the timing difference that is corrected by the closed loop timing advance control.

In Aspect 7, the method of any of Aspects 2 to 6 includes computing the new UE-specific timing advance value as a distance between a satellite position at a time when current UE location information is acquired and a current UE location at the time when the current UE location information is acquired divided by the speed of light, and computing the previous UE-specific timing advance value as a distance between the satellite position at the time when the current UE location information is acquired and a previous UE location at the time when the previous UE location information is acquired divided by the speed of light.

In Aspect 8, the method of any of Aspect 1 includes where the update value for the timing advance includes a new common timing advance value that is based on a position of a satellite relative to a reference point location of a reference point associated with the base station, and wherein the previous value for the timing advance includes a previous common timing advance value that is based on previous position of the satellite relative to the reference point location.

In Aspect 9, the method of Aspect 8 includes where computing the total value includes adding, to the previous common timing advance value, the timing difference between the update value and the previous value multiplied by a remaining portion of the timing difference that is not corrected by the closed loop timing advance control.

In Aspect 10, the method of Aspect 8 includes where computing the total value includes subtracting, from the new common timing advance value, the timing difference between the update value and the previous value multiplied by the portion of the timing difference that is corrected by the closed loop timing advance control.

In Aspect 11, the method of Aspect 8 includes where computing the total value includes setting the total value as the new common timing advance value, and further comprising adjusting a closed loop timing advanced value from the closed loop timing advance control by the timing difference between the update value and the previous value multiplied by the portion of the timing difference that is corrected by the closed loop timing advance control.

In Aspect 12, the method of any of Aspects 1 to 11 includes where computing the portion of the timing difference that is corrected by closed loop timing advance control from the base station includes dividing a closed loop timing advanced value from the closed loop timing advance control by the timing difference between the update value and a previous value for the timing advance of the satellite link.

In Aspect 13, the method of any of Aspects 1 to 12 includes where when there are no timing advance command received by the closed loop timing advance control from the base station between receiving the update value and receiving the previous update value, the portion is zero.

Aspect 14 is an apparatus for wireless communication including a transceiver, a memory configured to store instructions, and one or more processors communicatively coupled with the memory and the transceiver, wherein the one or more processors are configured to perform one or more of the methods of any of Aspects 1 to 13.

Aspect 15 is an apparatus for wireless communication including means for performing one or more of the methods of any of Aspects 1 to 13.

Aspect 16 is a computer-readable medium including code executable by one or more processors for wireless communications, the code including code for performing one or more of the methods of any of Aspects 1 to 13.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor,
memory coupled with the processor; and
instructions stored in the memory and operable, when executed by the processor, to cause the apparatus to:
  acquire location information for the apparatus from a global navigation satellite system (GNSS) fix to determine a location of the apparatus;
  receive an update value for a timing advance of a satellite link between the apparatus and a base station, wherein the update value for the timing advance includes a new UE-specific timing advance value that is based on the acquired location information;
  compute, based on the update value for the timing advance, a portion of a timing difference between the update value and a previous value for the timing advance of the satellite link that is corrected by closed loop timing advance control from the base station, wherein the previous value for the timing advance includes a previous UE-specific timing advance value that is based on previously acquired location information for the apparatus from a previous GNSS fix;
  compute, based at least in part on computing the portion, a total value for the timing advance of the satellite link by one of:
    adding, to the previous UE-specific timing advance value, the timing difference between the update value and the previous value multiplied by a remaining portion of the timing difference that is not corrected by the closed loop timing advance control;
    subtracting, from the new UE-specific timing advance value, the timing difference between the update value and the previous value multiplied by the portion of the timing difference that is corrected by the closed loop timing advance control; or
    setting the total value as the new UE-specific timing advance value and adjusting a closed loop timing advanced value from the closed loop timing advance control by the timing difference between the update value and the previous value multiplied by the portion of the timing difference that is corrected by the closed loop timing advance control; and
  apply, at the apparatus and based at least in part on the total value for the timing advance of the satellite link and the closed loop timing advance control, an applied timing advance for communicating with the base station.

2. The apparatus of claim 1, wherein the new UE-specific timing advance value and the previous UE-specific timing advance value are associated with a same satellite position and different apparatus locations.

3. The apparatus of claim 1, wherein the instructions, when executed by the processor, cause the apparatus to:
  compute the new UE-specific timing advance value as a distance between a satellite position at a time when the location of the apparatus is acquired and a current apparatus location at the time when the location of the apparatus is acquired divided by the speed of light; and
  compute the previous UE-specific timing advance value as a distance between the satellite position at the time when the location of the apparatus is acquired and a previous apparatus location at the time when the previously acquired location information is acquired divided by the speed of light.

4. The apparatus of claim 1, wherein the update value for the timing advance includes a new common timing advance value that is based on a position of a satellite relative to a reference point location of a reference point associated with the base station, and wherein the previous value for the timing advance includes a previous common timing advance value that is based on previous position of the satellite relative to the reference point location.

5. The apparatus of claim 1, wherein the instructions, when executed by the processor, cause the apparatus to compute the portion of the timing difference that is corrected by closed loop timing advance control from the base station at least in part by dividing a closed loop timing advanced value from the closed loop timing advance control by the timing difference between the update value and a previous value for the timing advance of the satellite link.

6. The apparatus of claim 1, wherein when there are no timing advance commands received by the closed loop timing advance control from the base station between receiving the update value and receiving a previous update value, the portion is zero.

7. A method for wireless communications at a user equipment (UE), comprising:
  acquiring location information for the UE from a global navigation satellite system (GNSS) fix to determine a location of the UE;
  receiving an update value for a timing advance of a satellite link between the UE and a base station, wherein the update value for the timing advance includes a new UE-specific timing advance value that is based on the acquired location information;
  computing, based on the update value for the timing advance, a portion of a timing difference between the update value and a previous value for the timing advance of the satellite link that is corrected by closed loop timing advance control from the base station, wherein the previous value for the timing advance includes a previous UE-specific timing advance value that is based on previously acquired location information for the UE from a previous GNSS fix;

computing, based at least in part on computing the portion, a total value for the timing advance of the satellite link by one of:
- adding, to the previous UE-specific timing advance value, the timing difference between the update value and the previous value multiplied by a remaining portion of the timing difference that is not corrected by the closed loop timing advance control;
- subtracting, from the new UE-specific timing advance value, the timing difference between the update value and the previous value multiplied by the portion of the timing difference that is corrected by the closed loop timing advance control; or
- setting the total value as the new UE-specific timing advance value and adjusting a closed loop timing advanced value from the closed loop timing advance control by the timing difference between the update value and the previous value multiplied by the portion of the timing difference that is corrected by the closed loop timing advance control; and applying, at the UE and based at least in part on the total value for the timing advance of the satellite link and the closed loop timing advance control, an applied timing advance for communicating with the base station.

8. The method of claim 7, wherein the new UE-specific timing advance value and the previous UE-specific timing advance value are associated with a same satellite position and different UE locations.

9. The method of claim 7, further comprising:
- computing the new UE-specific timing advance value as a distance between a satellite position at a time when the location of the UE is acquired and a current UE location at the time when the location of the UE is acquired divided by the speed of light; and
- computing the previous UE-specific timing advance value as a distance between the satellite position at the time when the location of the UE is acquired and a previous UE location at the time when the previously acquired location information is acquired divided by the speed of light.

10. The method of claim 7, wherein the update value for the timing advance includes a new common timing advance value that is based on a position of a satellite relative to a reference point location of a reference point associated with the base station, and wherein the previous value for the timing advance includes a previous common timing advance value that is based on previous position of the satellite relative to the reference point location.

11. The method of claim 7, wherein computing the portion of the timing difference that is corrected by closed loop timing advance control from the base station includes dividing a closed loop timing advanced value from the closed loop timing advance control by the timing difference between the update value and a previous value for the timing advance of the satellite link.

12. The method of claim 7, wherein when there are no timing advance commands received by the closed loop timing advance control from the base station between receiving the update value and receiving a previous update value, the portion is zero.

13. An apparatus for wireless communications, comprising:
- means for acquiring location information for the apparatus from a global navigation satellite system (GNSS) fix to determine a location of the apparatus;
- means for receiving an update value for a timing advance of a satellite link between the apparatus and a base station, wherein the update value for the timing advance includes a new UE-specific timing advance value that is based on the acquired location information;
- means for computing, based on the update value for the timing advance, a portion of a timing difference between the update value and a previous value for the timing advance of the satellite link that is corrected by closed loop timing advance control from the base station, wherein the previous value for the timing advance includes a previous UE-specific timing advance value that is based on previously acquired location information for the apparatus from a previous GNSS fix;
- means for computing, based at least in part on computing the portion, a total value for the timing advance of the satellite link by one of:
  - adding, to the previous UE-specific timing advance value, the timing difference between the update value and the previous value multiplied by a remaining portion of the timing difference that is not corrected by the closed loop timing advance control;
  - subtracting, from the new UE-specific timing advance value, the timing difference between the update value and the previous value multiplied by the portion of the timing difference that is corrected by the closed loop timing advance control; or
  - setting the total value as the new UE-specific timing advance value and adjusting a closed loop timing advanced value from the closed loop timing advance control by the timing difference between the update value and the previous value multiplied by the portion of the timing difference that is corrected by the closed loop timing advance control; and
- means for applying, based at least in part on the total value for the timing advance of the satellite link and the closed loop timing advance control, an applied timing advance for communicating with the base station.

14. A non-transitory computer-readable medium, comprising code executable by one or more processors for wireless communication at a user equipment (UE), the code comprising code for:
- acquiring location information for the UE from a global navigation satellite system (GNSS) fix to determine a location of the UE;
- receiving an update value for a timing advance of a satellite link between the UE and a base station, wherein the update value for the timing advance includes a new UE-specific timing advance value that is based on the acquired location information;
- computing, based on the update value for the timing advance, a portion of a timing difference between the update value and a previous value for the timing advance of the satellite link that is corrected by closed loop timing advance control from the base station, wherein the previous value for the timing advance includes a previous UE-specific timing advance value that is based on previously acquired location information for the UE from a previous GNSS fix;
- computing, based at least in part on computing the portion, a total value for the timing advance of the satellite link by one of:
  - adding, to the previous UE-specific timing advance value, the timing difference between the update value and the previous value multiplied by a remaining portion of the timing difference that is not corrected by the closed loop timing advance control;

subtracting, from the new UE-specific timing advance value, the timing difference between the update value and the previous value multiplied by the portion of the timing difference that is corrected by the closed loop timing advance control; or setting the total value as the new UE-specific timing advance value and adjusting a closed loop timing advanced value from the closed loop timing advance control by the timing difference between the update value and the previous value multiplied by the portion of the timing difference that is corrected by the closed loop timing advance control; and applying, at the UE and based at least in part on the total value for the timing advance of the satellite link and the closed loop timing advance control, an applied timing advance for communicating with the base station.

15. The apparatus of claim 13, wherein the new UE-specific timing advance value and the previous UE-specific timing advance value are associated with a same satellite position and different apparatus locations.

16. The apparatus of claim 13, further comprising:
compute the new UE-specific timing advance value as a distance between a satellite position at a time when the location of the apparatus is acquired and a current apparatus location at the time when the location of the apparatus is acquired divided by the speed of light; and compute the previous UE-specific timing advance value as a distance between the satellite position at the time when the location of the apparatus is acquired and a previous apparatus location at the time when the previously acquired location information is acquired divided by the speed of light.

17. The apparatus of claim 13, wherein the update value for the timing advance includes a new common timing advance value that is based on a position of a satellite relative to a reference point location of a reference point associated with the base station, and wherein the previous value for the timing advance includes a previous common timing advance value that is based on previous position of the satellite relative to the reference point location.

18. The apparatus of claim 13, wherein the means for computing the portion of the timing difference that is corrected by closed loop timing advance control from the base station includes means for dividing a closed loop timing advanced value from the closed loop timing advance control by the timing difference between the update value and a previous value for the timing advance of the satellite link.

19. The apparatus of claim 13, wherein when there are no timing advance command received by the closed loop timing advance control from the base station between receiving the update value and receiving a previous update value, the portion is zero.

20. The non-transitory computer-readable medium of claim 14, wherein the new UE-specific timing advance value and the previous UE-specific timing advance value are associated with a same satellite position and different apparatus locations.

21. The non-transitory computer-readable medium of claim 14, the code further comprising code for:
computing the new UE-specific timing advance value as a distance between a satellite position at a time when the location of the UE is acquired and a current UE location at the time when the location of the UE is acquired divided by the speed of light; and computing the previous UE-specific timing advance value as a distance between the satellite position at the time when the location of the UE is acquired and a previous UE location at the time when the previously acquired location information is acquired divided by the speed of light.

22. The non-transitory computer-readable medium of claim 14, wherein the update value for the timing advance includes a new common timing advance value that is based on a position of a satellite relative to a reference point location of a reference point associated with the base station, and wherein the previous value for the timing advance includes a previous common timing advance value that is based on previous position of the satellite relative to the reference point location.

23. The non-transitory computer-readable medium of claim 14, wherein the code for computing the portion of the timing difference that is corrected by closed loop timing advance control from the base station includes code for dividing a closed loop timing advanced value from the closed loop timing advance control by the timing difference between the update value and a previous value for the timing advance of the satellite link.

24. The non-transitory computer-readable medium of claim 14, wherein when there are no timing advance command received by the closed loop timing advance control from the base station between receiving the update value and receiving a previous update value, the portion is zero.

* * * * *